May 5, 1964 J. A. BRITTON 3,131,563

THERMAL POWER DEVICE

Filed Dec. 24, 1958

INVENTOR.
Jack A. Britton

BY Bosworth, Sessions,
Herrstrom and Knowles
ATTORNEYS.

United States Patent Office 3,131,563
Patented May 5, 1964

3,131,563
THERMAL POWER DEVICE
Jack A. Britton, 11720 Edgewater Drive,
Lakewood 7, Ohio
Filed Dec. 24, 1958, Ser. No. 782,963
11 Claims. (Cl. 73—368.3)

This invention relates to thermal responsive power devices, more particularly to such devices of the type in which useful motion is derived from the expansion of a confined body of flowable material when the latter is heated.

One object of the invention is to provide an expansible element for confining a body of thermally responsive flowable material, such element in combination with suitable casing means being adapted to translate thermal expansion of the confined body into useful motion without the element itself being subjected to objectionable stresses. According to the invention the element referred to takes the form of a cup-shaped diaphragm which forms part of a working chamber, the cup element being contained in and confined by a surrounding casing.

Another object is to provide a hollow element for confining a body of expansible material, the element preferably having an annular wall ridged and grooved in the form of a bellows to permit expansion and contraction largely restricted to axial movement with minimum stress of the material of such confining element. More particularly this aspect of the invention contemplates an element in the form of a cup-shaped bellows of molded deformable material such as rubber or plastic. As a still further refinement the expansible bellows element is confined in the casing so that one or more annular ridges of the bellows is circumferentially embraced by the casing and thereby supported against excessive radial distention.

Another object is to provide such a power device in which the thermally expansible body is confined in a chamber defined in part by an expansible bellows element such as referred to and in part by a relatively inexpansible portion of the casing. More specifically this aspect of the invention contemplates an arrangement in which one portion of the casing comprises a metal cup having its open end registered with the open end of the expansible cup element so that the casing cup and the bellows cup cooperatively define a completely enclosed chamber for the expansible body of flowable material.

Another object is to provide such a power device in which the motion of the thermally responsive body is translated by a completely encased, substantially unstressed bellows element to obtain long life, durability and sensitivity in the device.

Another object is to provide a power device which responds quickly, accurately and certainly to temperature reductions and effects prompt retraction of the working arm or rod. Other objects and advantages will become apparent and a full understanding of the invention may be had by reference to the following description of several embodiments representing the best known mode of practicing the invention, this description being made in conjunction with the accompanying drawings which form part of the specification.

Figure 1:
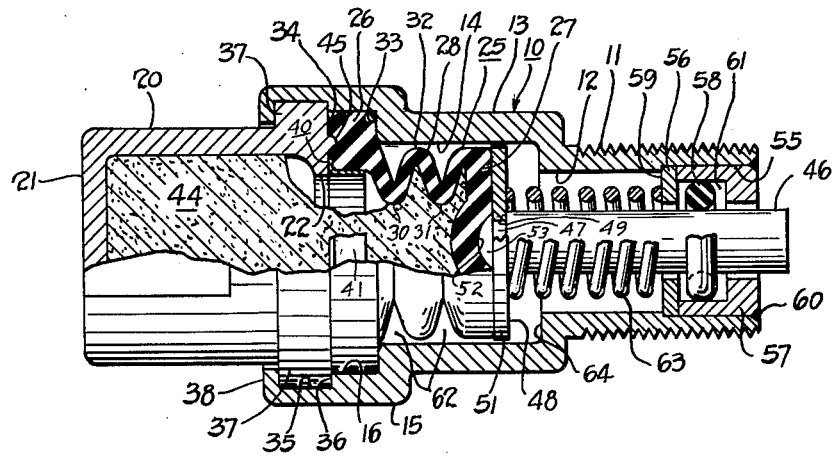
FIG. 1 is a side elevational view partly in section and with parts broken away and removed showing a thermal responsive device representing a preferred form of the invention.

The device of the present invention comprises a tubular body member 10 of a suitable metal such as brass or similar rigid material. The body is shown as a turning having a series of stepped diameter portions 11, 13 and 15 and corresponding internal cylindrically walled chamber portions 12, 14 and 16, respectively, all in coaxial end to end relation. A cylindrically shaped cup member 20, which is of durable rigid material and may comprise a turning of brass or other suitable metal, is disposed in coaxial relation to the body 10 and constitutes a closure for the opening in the large end portion 15 of the body. The circular opening in the cup 20 registers with the opening in the end of the body 10 so that the interiors of the body and the cup comprise portions of a common chamber. The metal cup 20 has a circular bottom or closure wall 21 and its circular opening is defined by a shallow inwardly directed radial flange 22.

The internal chamber of the casing means is partitioned by a diaphragm which comprises a bellows 25 of resilient deformable material such as rubber suitably compounded to be resistant to oils and greases as, for example, a synthetic rubber such as neoprene or Hycar. The bellows is formed by molding in accordance with conventional techniques in the rubber industry to have substantially the same physical characteristics as molded surgical goods, flexible rubber breather tubes used in respirators and like items exhibiting high flexibility, durability and long life under conditions of varying temperatures. The bellows comprises a relatively heavy sectioned annular ring portion 26, a circular disk-like end 27 and an intermediate annular wall 28 which connects and is integral with the ring 26 and the end wall 27. The connecting wall 28 is corrugated, having two internal ridges 30, 31 and an external ridge 32.

In the molded or unstressed condition of the bellows 25 the circular peripheries of the end wall 27 and the external ridge 32 are slightly less than the diameter of the cylindrical internal wall 14 of the body 10 so as to be guidingly received within the intermediate chamber portion of the body and embraced and restrained by the wall 14 against excessive distention when subjected to internal pressure. The end ring 26 is of relatively thick preferably rectangular radial section, having a radial thickness and also an axial thickness of at least about three times the thickness of the corrugated annular wall 28. The end ring 26 has preferably a "Durometer" hardness of from about A-60 to about 70. The external diameter of the end ring is greater than that of the end wall 27 and that of the annular wall 28, permitting such end ring to be clamped between a radial shoulder 33, formed at the juncture of the internal wall portions 14, 16 of the tubular body 10, and circular end face 34 of the cup member 20.

A counterbore 35 in the large end portion 15 of the tubular body 10 provides a radial shoulder 36 for engagement by the end face 34 of the cup 20 to locate the latter axially in relation to the body member 10. The counterbore 35 slidingly receives the periphery of outwardly projecting radial flange 37 of the cup 20 to center the cup on the axis of the body. An annular holding flange 38 is formed on the body 10 behind the cup flange 37 by spinning the end of the large portion 15 against the rear face of the cup flange. The flange 38 thus locks the cup and body together, holding the cup snugly against the locating shoulder 36 with the bellows ring 26 clamped between the casing parts.

A reinforcing ring 40 of suitable thin sheet metal such as stainless steel cooperates with the confronting metal surfaces 33, 34 of the body 10 and cup 20, respectively, in confining the base ring 26 of the bellows 25. The ring 40 is L-shaped in radial section, comprising a cylindrical shell portion 41 received inside and slightly distending the molded diameter of the bellows end ring 26 and an annular outwardly projecting radial flange portion 42 locatingly clamped between the bellows ring and the end face 34 of the cup 20.

In its molded or unstressed condition the bellows ring 26 is of greater axial thickness than shown in FIG. 1 so as to be compressed between the body shoulder 33 and the cup end face 34 in assembly. The confinement of the bellows ring, axially between the surfaces 33, 34 and radially between the cylindrical portion 41 of the ring 40 and the surrounding cylindrical surface 16 of the casing body locks the bellows in place and provides an effective seal to prevent escape of thermally expansible material 44. This material fills the working chamber of the device comprising the fixed volume interior of the cup 20 and the variable volume interior of the bellows 25. The seal between the metal and rubber surfaces is enhanced by providing one or more annular ribs or ridges 45 on one or more of the rubber contacting metal surfaces such, for example, as the end surface 34 of the cup 20. A matching groove is molded in the end face of the rubber ring 26 to locate the bellows and the metal cup in predetermined coaxial relation during their assembly together which may thus be accomplished apart from the tubular body 10.

The body of thermally responsive material 44 which fills the working chamber of the device may be any one of several known chemically stable, flowable materials which expand when heated, such for example as a suitable wax or grease. For use in power units employed as motors in relief valves for domestic hot water systems, a suitable material is N-methyl-acetanilide which has a relatively high rate of expansion starting at about 210° F.

Expansion of the flowable material 44 under the influence of heat is translated into useful work by axial motion relative to the casing body 10 of a thrust rod 46 which extends axially through the end portion 11 of the body and into the chamber 14 of the intermediate portion 13. The rod 46 has a short reduced diameter inner end portion 47 received in a central opening of a circular flat metal disk member 48. The formation of the reduced portion 47 on the thrust rod 46 provides an annular shoulder against which the disk member 48 is located in assembly. The disk member may be press fitted or otherwise suitably secured on the rod and has sliding engagement with the cylindrical wall 14 of the intermediate body portion 13 to retain the coaxial relation of the rod to the tubular body. Preferably, the diameter of the disk 48 is slightly greater than that of the end wall 27 of the bellows 25 so that periphery 51 of the disk projects radially beyond the bellows to minimize frictional drag of the rubber bellows against the surrounding wall 14 of the body member. To center the end wall 27 of the bellows in relation to the thrust disk 48, the end wall of the bellows is formed with a central depression or recess 52 received over a protuberance 53 comprising the spherically rounded end of the thrust rod 46.

Within a counterbore 55 in the small end portion 11 of the tubular casing body 10 is received a combined guide, seal and reaction assembly which surrounds the thrust rod 46. This assembly includes a flat metal washer 56, a metal ring 57 of L-section and a rubber O-ring seal 58. The washer 56 is received against a shallow internal radial shoulder 59 provided in the body end portion 11 at the juncture of the cylindrical wall 12 and the counterbore 55. The cylindrical flange portion of the ring 57 is abutted against the washer 56 and is held in place by spinning over the small end of the casing body or, as shown, by solder 60. The O-ring 58, of resilient deformable material such as rubber, is received in the angle of the L-sectioned ring 57 and, in effect, is confined in an annular chamber 61 surrounding the rod 46, the axial limits of such chamber being defined by the washer 56 and the radially inwardly projecting portion of the ring 57. The axial length of the chamber 61 is greater than the thickness of the O-ring and the radial dimension of such chamber is slightly less than the O-ring thickness so that the O-ring is compressed radially by and rolls on the rod 46 and the surrounding cylindrical wall of the chamber 61 when the thrust rod 46 moves axially relative to the body member 10. The radial compression of the O-ring between the rod and the surrounding cylindrical wall thus provided by the ring 57 insures a permanent, tight seal which prevents entrance of dirt, moisture or other foreign material into the interior of the body through the forward or working end of the device.

A helical coil spring 63, axially compressed, is received about the thrust rod 46 in the casing chamber. One end of the spring engages the disk 48 to bias the latter toward and against the bellows 25, the other end of the spring reacting against the washer 56. The spring 63 retracts the thrust rod 46 into the casing when the flowable thermally responsive material 44 contracts.

When the device is heated, causing the flowable material 44 to expand, such expansion is manifested by axial distention of the bellows 25, forcing the disk 48 and the thrust rod 46 to the right as viewed in FIG. 1. The limit of motion is determined by engagement of the disk against an internal radial shoulder 64 formed at the juncture of the cylindrical body surfaces 12 and 14. For example, when the chamber sections are filled with N-methyl-acetanilide and the assembled unit is heated so that the temperature of such thermo responsive material 44 reaches about 210° F., the thrust rod 46 is moved by the forwardly projecting portion of the bellows. When, with continued heating, the temperature of the N-methyl-acetanilide reaches about 212° F. the thrust rod collar 48 is abutted against the internal shoulder 64 of the tubular member 10. The distance travelled by the thrust rod, from the initial to the final position is limited by the stop and may be assumed for purposes of this illustration to be about 1/8". The time required, after heat is no longer applied, and under the aforementioned conditions, for the thrust rod to return from the final to the initial position is normally of the order of about 80 seconds providing the test is conducted in free air and no cooling means other than air at normal room temperature of about 72° F. is used. However, if instead of free air there is applied 50° F. water, the time to return the rod to the initial position is reduced to about 45 seconds or less. The operating performance of the element, as aforestated, when using the 210° F. operating temperature thermo responsive material remains the same, or substantially so, over a wide variation of load conditions. Similar good results and operating efficiencies can be achieved when using diphenoxyethane as the thermo responsive material 44 which is useful over a somewhat lower temperature range.

Although axial movement of the thrust rod 46 is limited, continued expansion of the flowable material 44 after engagement of the shoulder stop 64 by the washer 48 is accommodated by radial distention of the annular bellows wall 28, portions of the bellows wall and the internal cylindrical surface 14 of the body member 10 being separated by one or more annular clearance spaces 62 filled with air or other compressible material which allows certain portions of the rubber bellows to expand when internal pressure above the design range is reached.

In using the device it is anchored as by fastening the small end 11 in a suitable socket. The connection can be made by soldering or, as shown, the end 11 may be externally threaded to permit the device to be screwed into place. The thrust rod 46 is positioned to bear against a relatively movable part of an instrumentality to be actuated such, for example, as against the valve body of a relief valve, when the device, particularly the cup-shaped receptacle 21, is subjected to predetermined temperature changes.

Figures 4, 5, 6:
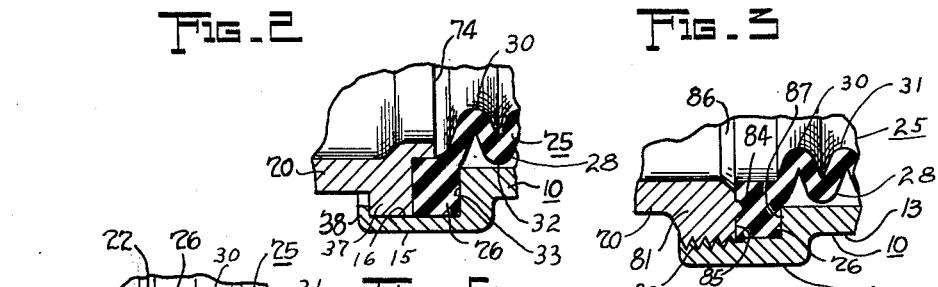
FIGS. 4–6 are fragmentary longitudinal sectional details through the joint between the casing parts and the diaphragm bellows showing modifications.

FIGS. 4, 5 and 6 illustrate modifications in which parts corresponding to those previously described are identified by the same numerals of reference.

In FIG. 4 the cup member 20 and the body member 10 are secured by a threaded joint 66 permitting the parts to be screwed together in assembly. The ring portion 26 of the bellows 25 is formed with an integral outwardly projecting radial flange 67 which is of greater radial width than axial thickness. One face of this thin flange is coplanar with the end face of the bellows ring 26. Thus the flange is readily clamped between the end face 34 of the cup 20 and a radial shoulder 68 which is formed at the juncture of first and second counterbores 71, 72 in the large diameter end portion 15 of the body 10. The relatively thick section of the main portion of the ring 26 stabilizes the bellows against deformation and collapse at the open end while the relatively thin integral flange 67 provides an effective seal since it is squeezed between the main tubular casing body 10 and the casing cup 20.

In the modification of FIG. 5 there is formed along the inner edge of the rim of the cup member 20 an integral axially projecting annular flange 74 which is received within the heavy sectioned end ring 26 of the rubber bellows. The flange 74 thus serves to confine the bellows ring similarly to the reinforcing ring 40 previously described which it replaces. In assembling the device of FIG. 5 the parts are clamped in a suitable fixture which subjects the bellows ring 26 to predetermined axial pressure sufficient to provide the desired seal between the parts, the clamping flange 38 being rolled or spun over with the body and cup members 10, 20 held in the clamped position. The counterbore 35 is omitted, eliminating the locating shoulder 36 so that the axial position of the cup relative to the tubular body 10 is determined by the axial forces applied to the parts in compressing the bellows ring 26.

Figures 2, 3:
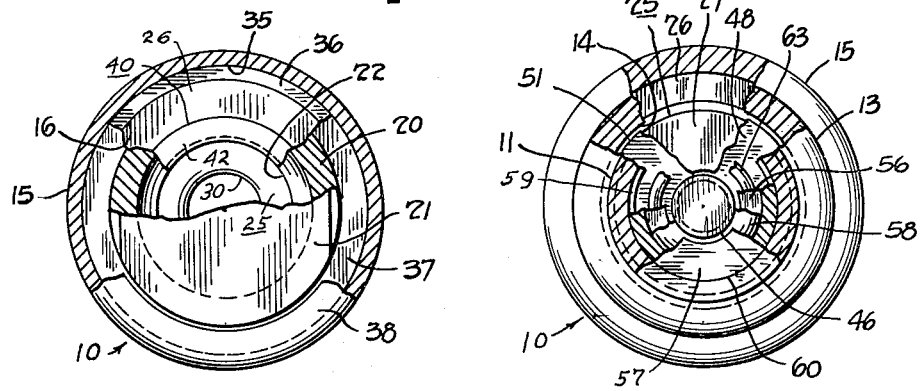
FIGS. 2 and 3 are views of the left and right ends, respectively, of the device of FIG. 1, parts being broken away and removed in both views to show the internal construction.

In the embodiment of FIG. 6 the casing body 10 and cup 20 are held together by a threaded joint 80 comprising external threads on a thickened end flange or rim 81 of the cup 20 and internal threads on end portion 82 of the body 10, which end portion corresponds to the end portion 15 previously described in connection with FIGS. 1–3. In this modification the interior of the cup 20 is of cylindrical shape as in the preceding embodiments of the device, but the cup opening is of the same diameter as the cup chamber, the inwardly projecting annular flange 22 described in connection with FIG. 1 being eliminated and the edge corner surrounding the cup opening being beveled at 86. An annular rib 84 formed on end face 85 of the cup rim 81 is received in a mating groove or channel of the bellows end ring 26 to locate the parts in assembly and to lock the bellows ring between the rim 81 of the cup and a radial shoulder 87 of the body 10, the latter corresponding to the shoulder 33 described above.

In assembling the device of the present invention discrete portions of the flowable thermal responsive material 44 are packed or filled separately into the cup 20 and the bellows 25. The filled components are then brought together with the tubular body 10 received over the bellows and made fast to the rim of the cup member as by the rolled flange 38 of FIGS. 1 and 5 or the threaded joint of FIGS. 4 and 6. Accuracy in weight and consistent uniformity in loading the thermo responsive material 44 are accomplished by preliminarily casting two sections of heat softened wax under pressure in suitable molds or dies to form two pellets of predetermined size and weight conforming generally to the sizes of the two chamber portions in the metal cup 20 and the bellows. The actual filling of these parts is done under solid wax condition, the wax pellets having been cooled in the dies. Each wax pellet is then compressed into its intended receptacle and the cup 20 and the bellows 25 are brought together forming a completely assembled unit. Thereafter, heat is externally applied to the assembled unit. The pre-weighed and pre-cast wax filled pellets then run freely and conform to and fill all contours and spaces within the two portions constituting the total chamber volume.

In filling the cup 20 apart from the bellows 25 as described above, the cup is conveniently supported in a suitable fixture with its opening uppermost. The flowable material is then placed in the cup either in the form of the pre-measured charge or pellet mentioned or by filling the cup flush with the face 34 of the rim 37. The bellows 25 is also conveniently filled while supported with its opening uppermost as by providing a socket or recess in a suitable fixture. By reason of the irregular internal shape of the rubber bellows the pre-measured pellet of flowable material may be forced into place, the walls of the socket in the supporting fixture embracing the bellows and resisting objectionable distention of the bellows while it is being filled. The total mass of the flowable material 44 contained in the cup 20 and the bellows 25 is thus predetermined.

The present invention provides a thermal power unit exhibiting a relatively long travel or movement of the actuating rod 46 without objectionable distortion or working of the bellows 25. Such bellows constitutes the diaphragm dividing the internal chamber of the casing means into the working chamber portion containing the thermally responsible flowable material and the air space or expansion chamber. The bellows, by reason of its corrugated shape, inherently resists radial distention in normal operation, is supported against objectionable radial distention by the surrounding cylindrical wall 14 of the expansion chamber. Upon the occurrence of internal pressures above the design working range, wall portions of the bellows comprising the internal ridges 30, 31 distend radially into the surounding air space to prevent damage to the bellows or to the instrumentality with which the power unit is associated.

In accordance with the patent statutes the principles of the present invention may be utilized in various ways, numerous modifications and alterations being contemplated, substitution of parts and changes in construction being resorted to as desired, it being understood that the embodiments shown in the drawings and described above and the particular methods set forth are given merely for purposes of explanation and illustration without intending to limit the scope of the claims to the specific details disclosed.

What I claim and desire to secure by Letters Patent of the United States is:

1. A power element having a casing comprising a tubular open ended body member and a hollow cup member having one open end, said members being disposed in end to end relation with the open end of said cup member registered with one end of the body member in the provision of an internal chamber, a thrust rod having a disc on one end, said disc having a circular periphery being centered on and projecting radially beyond the rod and guided within said body member for longitudinal movement of the rod relative to the body, the other end of said rod projecting through the other end of the tubular body member; a hollow circular sectioned cup shaped diaphragm of resilient deformable material having closed and open ends said diaphragm being contained wholly within the casing with its closed end pressuringly engaging the disc, said diaphragm partitioning said chamber and having a radially outwardly directed circumferential rim tightly secured in sealing engagement with and between the body and cup members, the diaphragm having a circular wall located concentrically within the body member and, in its unstressed condition, separated from such body member by an annular clearance, the diaphragm interior and the interior of the cup member being continuous and defining an expandable chamber, a thermal responsive flowable composition substantially filling said expandable chamber and upon predetermined heating being adapted to expand said diaphragm, and a resilient member concentrically positioned relative to said thrust rod and adapted to oppose elongation of said diaphragm, the disc periphery being closely surrounded by the body member guidingly to restrain the rod against lateral shifting, means within the body member adjacent its other end defining an annular channel surrounding and opening toward the rod, a rubber O-ring in said channel and in circular contact with the rod, and the resilient member being located wholly within the body member between the disc and the O-ring.

2. In a device as in claim 1, the channel defining means comprising a pair of companion rings abutting one another, and means securing the companion rings in the body member and locating them axially therein in predetermined positions.

3. In a power device of the type comprising an actuating medium in the form of a body of flowable thermal responsive material which expands when heated, casing means comprising interfitted separate parts having axially directed confronting annular clamping surfaces, a diaphragm of resilient deformable material within the casing means and dividing the interior thereof into a working chamber portion in one of the casing parts containing said body and a rod chamber portion, in the other of said casing parts, said diaphragm comprising a central partition portion and, surrounding the central portion and integrally joined thereto, a circular rim portion clamped between the confronting casing surfaces, said rim portion having a radially inwardly directed circular surface, a rigid ring having flange means extending into said rim portion of the diaphragm means and disposed against said inwardly directed surface and reinforcing the rim portion against radial contraction, the casing means being formed to engage the ring supportingly and to locate the ring in coaxial relation to the rim portion, and a motion transmitting rod extending axially into the rod chamber portion and having an end disposed to bear against the diaphragm means.

4. In a device as in claim 3, the ring being L shaped in radial section and including a portion confined between the rim portion of the diaphragm and one of the confronting surfaces of the casing means.

5. In a device as in claim 3, the casing means including an axial protuberance and the reinforcing ring being engaged and located by the protuberance in concentric relation to the axis of the device.

6. In a device as in claim 5, the protuberance being positioned radially outwardly of the reinforcing ring and embedded in the diaphragm rim portion.

7. In a power device of the type comprising an actuating medium in the form of a body of flowable thermal responsive material which expands when heated, casing means comprising interfitted separate parts having axially directed confronting annular clamping surfaces, diaphragm means within the casing means and dividing the interior thereof into a working chamber portion containing said body and a rod chamber portion, said diaphragm means comprising a cup of resilient deformable material having a circular rim clamped between the confronting casing surfaces, said diaphragm means also including a working end wall and, extending axially between and connecting the rim and the end wall, an annular wall portion, the casing means including a tubular portion defining said rod chamber portion, said tubular portion having an internal annular wall surface, such end and annular walls of the diaphragm means being surrounded by the internal wall surface and, in the unstressed condition of the diaphragm, being separated therefrom by an annular clearance, said diaphragm annular wall portion being expandable radially into contact with the internal annular wall surface by internal pressure resulting from expansion of the thermal responsive material and having an external surface comprising relatively raised lands and depressed areas for engagement between the internal casing wall surface and the lands only of such expanded annular wall portion with the depressed areas remaining spaced from such internal wall surface, a motion transmitting rod extending axially into the rod chamber portion, and the rod having an inner end element disposed to bear axially against the working end wall of the diaphragm means.

8. In a power device as claimed in claim 7, the end element of the motion transmitting rod projecting radially beyond the end wall of the diaphragm means and being engageable against the internal wall surface of the casing means to steady the rod and guide it during axial movement.

9. In a power device as claimed in claim 8, the end element of the rod and the end wall of the diaphragm cup having complemental interfitting axial formations adapted to locate such end wall in predetermined relation to the end element, the engagement of the latter against the internal wall surface locating the diaphragm end wall concentrically in the tubular portion of the casing means.

10. In a power device of the type comprising an actuating medium in the form of a body of flowable thermal responsive material which expands when heated, casing means comprising interfitted separate parts having axially directed confronting annular clamping surfaces, a diaphragm of resilient deformable material within the casing means and dividing the interior thereof into a working chamber portion in one of the casing parts containing said body and a rod chamber portion in the other of said casing parts, said diaphragm comprising a central partition portion and, surrounding the central portion and integrally joined thereto, a circular rim portion clamped between the confronting casing surfaces, said rim portion being generally and substantially thicker than the partition portion and constituting a relatively heavy sectioned anchorage for the partition portion, said rim portion having a radially inwardly directed circular surface, means on and wholly supported by said one of the casing parts providing an annular flange disposed inside the rim portion of the diaphragm and against said circular surface of the latter to support the rim portion against radial displacement under clamping pressure of the casing parts, said other of the casing parts having an end opening, and a motion transmitting rod extending axially into the rod chamber portion through said end opening, the rod having an inner end disposed to bear axially against the partition portion of the diaphragm.

11. In a power device as claimed in claim 10, said annular flange means comprising a ring element separate from the one casing part.

References Cited in the file of this patent

UNITED STATES PATENTS

| | | |
|---|---|---|
| 1,907,869 | Raney | May 9, 1933 |
| 2,259,846 | Vernet | Oct. 21, 1941 |
| 2,265,586 | Vernet | Dec. 9, 1941 |
| 2,534,251 | Dillman | Dec. 19, 1950 |
| 2,598,351 | Carter | May 27, 1952 |
| 2,694,415 | Dillon | Nov. 16, 1954 |
| 2,768,036 | Greenough | Oct. 23, 1956 |
| 2,789,580 | Woods | Apr. 23, 1957 |
| 2,843,151 | Greenawalt | July 15, 1958 |
| 2,920,656 | Bertolet | Jan. 12, 1960 |
| 2,924,975 | Vernet | Feb. 16, 1960 |
| 2,938,384 | Soreng et al. | May 31, 1960 |